United States Patent [19]

Gratzer

[11] Patent Number: 5,443,147
[45] Date of Patent: Aug. 22, 1995

[54] ROTATIONALLY DEPENDENT FREE-WHEELING COUPLING

[75] Inventor: Franz Gratzer, Köppling, Austria

[73] Assignee: Steyr-Daimler Puch AG, Vienna, Austria

[21] Appl. No.: 222,802

[22] Filed: Apr. 5, 1994

[30] Foreign Application Priority Data

Apr. 6, 1993 [DE] Germany .................. 43 11 288.9

[51] Int. Cl.⁶ .................. F16D 41/10; F16D 41/07; F16D 41/067
[52] U.S. Cl. .................. 192/27; 192/31; 192/36; 192/44; 192/45.1
[58] Field of Search .............. 192/31, 37, 38, 36, 192/41 A, 27, 44, 45.1

[56] References Cited

U.S. PATENT DOCUMENTS

| | | | |
|---|---|---|---|
| 3,194,369 | 7/1965 | Witte | 192/36 X |
| 3,406,798 | 10/1968 | Curran | 192/38 X |
| 4,124,085 | 11/1978 | Fogelberg | . |

FOREIGN PATENT DOCUMENTS

2740638 3/1978 Germany .

Primary Examiner—Rodney H. Bonck
Attorney, Agent, or Firm—Meltzer, Lippe, Goldstein et al.

[57] ABSTRACT

A rotationally-dependent free-wheeling coupling for a motor vehicle comprises a first ring which constitutes a driving element in the towing mode of the motor vehicle, a second ring which constitutes a driven element in the towing mode, clamping elements which act between the first and second rings to transfer torque therebetween in both directions of torque flow, a cage which holds the clamping elements, and a friction element which causes the cage to rotate with the second ring. The rotationally-dependent free-wheeling coupling further comprises a latch which acts between the first ring and the cage, the latch being mounted for swiveling movement on an axle and entering a recess in the cage, the recess having a wall which constitutes a stop for the latch and defining a neutral (free-wheeling) position, a retaining spring which presses the latch into the recess of the cage, and a slipping spring. The slipping spring has a loop which is coiled around a fixed ring in a direction of rotation such that a protruding spring arm causes the latch to disengage from the recess in opposition to the force of the retaining spring when the vehicle is in reverse travel.

10 Claims, 8 Drawing Sheets

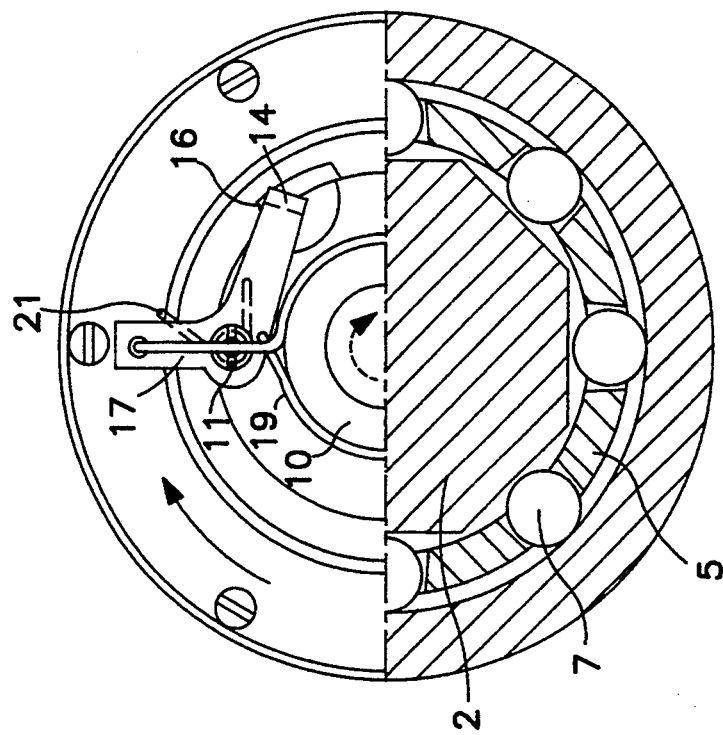
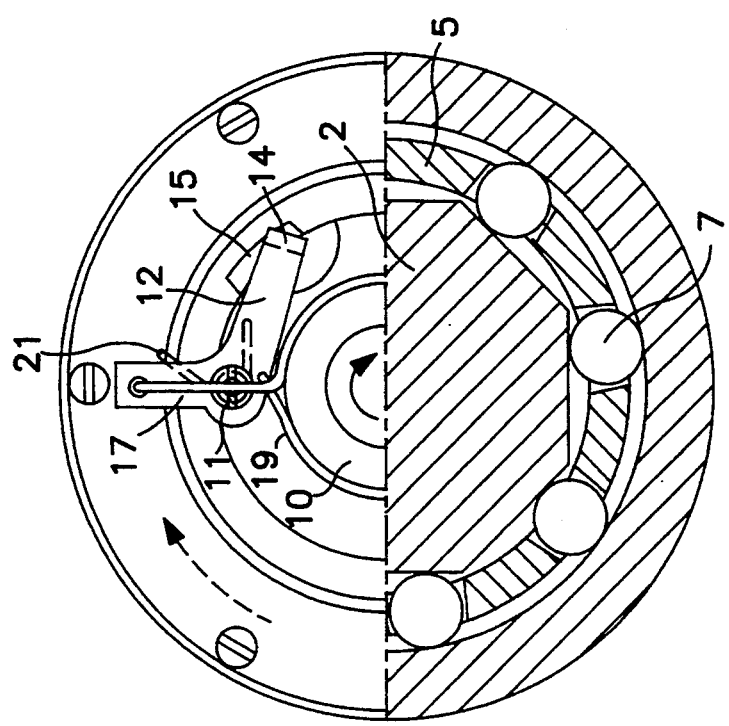

ROTATIONALLY DEPENDENT FREE-WHEELING COUPLING

BACKGROUND OF THE INVENTION

In an all-wheel drive motor vehicle wherein a second axle (usually the rear axle) is driven via a slip-controlled clutch, the problem exists that the rear wheels tend to over-brake. This problem arises because of the connection to the front wheels and results in the loss of road adherence and vehicle swerving. These conditions are especially critical when lock-up braking occurs or when an ABS (anti-lock brake system) is used.

For this reason, a free-wheeling coupling (sometimes referred to as an overrunning clutch) is normally used so that no controllable separation clutch is needed. A free-wheeling coupling has, however, the disadvantage that it must be locked when all-wheel drive is needed also in reverse. To overcome this disadvantage, a double-acting free-wheeling coupling which makes the transfer of drive forces possible in forward and reverse travel may be used. A double-acting free-wheeling coupling has the disadvantage, however, that in forward travel as well as in reverse travel uncoupling occurs when the vehicle is in thrust mode, and this may result in dangerous situations on icy mountain roads or off the road. (In this description, the "towing mode" refers to the situation when the engine drives the vehicle and torque flows from the engine to the axle, whether the vehicle is in forward or reverse travel. "Thrust mode" refers to the situation wherein the engine brakes the vehicle and torque flows from the axle to the engine.)

For this reason, double-acting clamping element couplings have been proposed, in which elements sensing rotational speed differences ensure coupling in both directions of torque flow and where centrifugal elements prevent torque flow reversal at higher speeds (e.g., the German patent applications DE 42 01 375, 42 02 152 and 42 25 202 by the assignee herein). These solutions have the disadvantage, however, that when circumferential speeds of front and rear wheels differ because of tire wear or due to layout necessities, stress within the vehicle occurs at low speed and low load causing not only performance losses but also causing the clamping elements to be held in the clamped position. For this reason further solutions to this problem have been investigated.

The instant invention therefore deals with a free-wheeling coupling comprising the following elements: a first ring which is the driving element in towing mode, a second ring which is the driven element in towing mode, clamping elements which act between the first and the second rings, in both torque flow directions, a cage which holds the clamping elements, and a frictional element acting between the cage and the second ring. DE-A 27 40 638 (U.S. Pat. No. 4,124,085) discloses such a free-wheeling coupling with wedging rollers acting in both directions to transfer drive forces to the second power shaft of a vehicle (in this case, the front axle). A frictional connection exists between the ring pertaining to the second power shaft and the roller cage. When overrunning occurs, a latch mechanism controlled via a second frictional connection to the fixed housing prevents the roller cage from moving into the position in which torque flows from the second power shaft to the drive mechanism of the vehicle or to the first power shaft. Therefore, the second power shaft always runs freely in towing mode, and this affects driving safety in the above-mentioned manner.

In this prior art coupling, the frictional element sensing the absolute rotational speed has the disadvantage of relatively high power losses and is prone to wear. Furthermore, the frictional force of the roller cage cannot be maintained reliably in case of extreme accelerations, e.g., in case of lock-up braking, because of the great inertial forces that are generated. By these, the wedging rollers run up on the ramp surfaces so that the free-wheeling coupling are also locked in thrust mode. However, this also leads to blockage of the wheels of the second driven axle and thereby to the loss of braking stability. It also may lead to the destruction of the free-wheeling coupling.

It is therefore the object of the instant invention to avoid the disadvantages of the two types of constructions mentioned above and to provide a free-wheeling coupling which is dependent on the direction of rotation and which acts as a free-wheeling coupling only during forward travel without any external actuation. The problems discussed at the outset are to be solved by means as simple and inexpensive as possible with minimum wear and without the power loss associated with slip-controlled clutches.

SUMMARY OF THE INVENTION

In accordance with the present invention, a rotationally-dependent free-wheeling coupling for a motor vehicle comprises a first ring which constitutes a driving element in the towing mode of the motor vehicle, a second ring which constitutes a driven element in the towing mode, clamping elements which act between the first and second rings to transfer torque therebetween in both directions of torque flow, a cage which holds the clamping elements, and a friction element which causes the cage to rotate with the second ring. The rotationally-dependent free-wheeling coupling further comprises a latch which acts between the first ring and the cage, the latch being mounted for swiveling movement on an axle and entering a recess in the cage, the recess having a wall which constitutes a stop for the latch and defining a neutral (free-wheeling) position, a retaining spring which presses the latch into the recess of the cage, and a slipping spring. The slipping spring has a loop which is coiled around a fixed ring and a protruding spring arm which acts on the latch. The loop is coiled around the fixed ring in a direction of rotation such that the protruding spring arm causes the latch to disengage from the recess in opposition to the force of the retaining spring when the vehicle is in reverse travel.

According to the invention the free-wheeling coupling may be provided with additional elements having the characteristics described below but which also meet the requirements of positive interlocking in both torque flow directions during reverse travel, and uncoupling when braking during forward travel, while ensuring completely friction-free and wear-free operation in all continuous operation states and prevention of breakthrough when the torque flow direction changes. Breakthrough occurs when the clamping elements are disengaged from the ramps for one torque flow direction and moved into neutral position so fast that they overshoot and engage the other ramps for the opposite torque flow direction. They then couple when they should not do so during breaking.

Many different embodiments are possible within the framework of the invention. Thus, the axle of the latch can be located on the cage and the latch can engage the first ring or an element connected therewith, or the axle of the latch can be located on the first ring or on an element rotating with it and engage the cage.

With respect to the clamping elements, different embodiments are possible. They can be either clamping rollers, or they can be elements having clamping surfaces which interlock with the first ring and act in both torque flow directions, i.e., they need not be cylindrical.

If the clamping surfaces of non-cylindrical clamping elements are to interact by frictional engagement with both rings, different variants are possible. In one variant, an additional cage is frictionally engaged with the first ring and the latch acts between the cage and the additional cage rotating with the first ring. In this embodiment, this frictional force is greater than the frictional force between the second ring and the cage when the axle of the latch is located on the additional cage and the latch is designed to engage the cage.

In another variant, the arrangement of the axle of the latch and of the recess for the latch are reversed and the relationship between the frictional forces is reversed.

In a refinement of the invention, an additional spring can be provided which acts between the cage and the first ring or the additional cage. This spring ensures that the cage assumes a position allowing for the free-wheeling function during forward travel when the transition from reverse travel to forward travel occurs.

Finally, the effect of the invention is also independent of the design of the two rings. Somewhat simpler embodiments can be achieved in some cases when the first ring is the inner ring.

BRIEF DESCRIPTION OF THE DRAWINGS

The invention is described and explained below through the drawings, wherein.

FIGS. 5 to 8 show a schematic representation of the coupling according to FIGS. 2 and 3 in different operating positions;

DETAILED DESCRIPTION OF PREFERRED EMBODIMENTS

Figure 1:
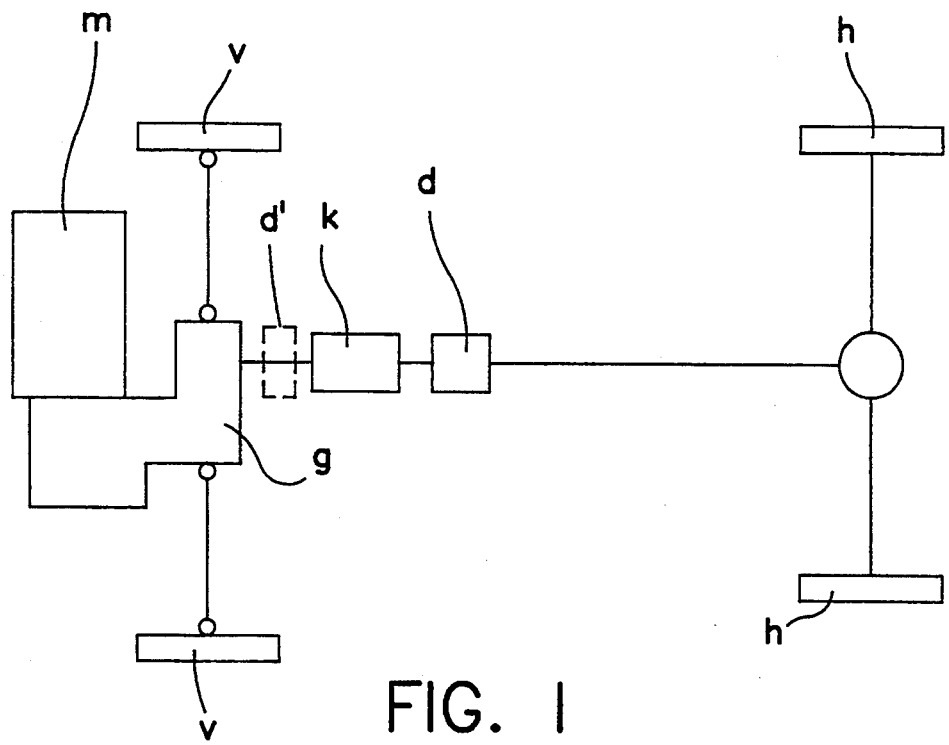
FIG. 1 is a schematic representation of an all-wheel drive motor vehicle with the free-wheeling coupling of the present invention.

The all-wheel drive motor vehicle schematically shown in FIG. 1 is provided with an engine gearbox unit m by means of which the front wheels v are driven via a branching gearing g, and the rear wheels h are driven via a slip-controlled coupling k and the direction-of-rotation dependent free-wheeling coupling of the present invention. The slip-controlled coupling k could be a multiple-disk coupling, a hydrostatic coupling, a hydrodynamic coupling, a controlled or a non-controlled viscous shear coupling, or an electromagnetic or electro-viscous coupling. The free-wheeling coupling according to the invention could also be located between the branching gearing g and the slip-controlled coupling k, as is indicated by a broken line d'.

Figure 4:
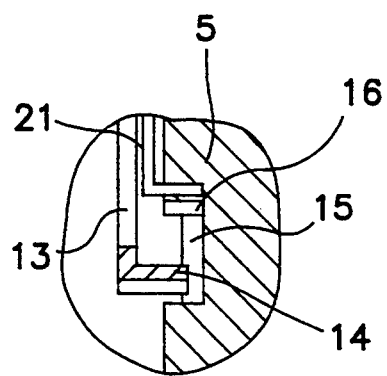
FIG. 4 shows a detailed section A of FIG. 2.
Figure 2:
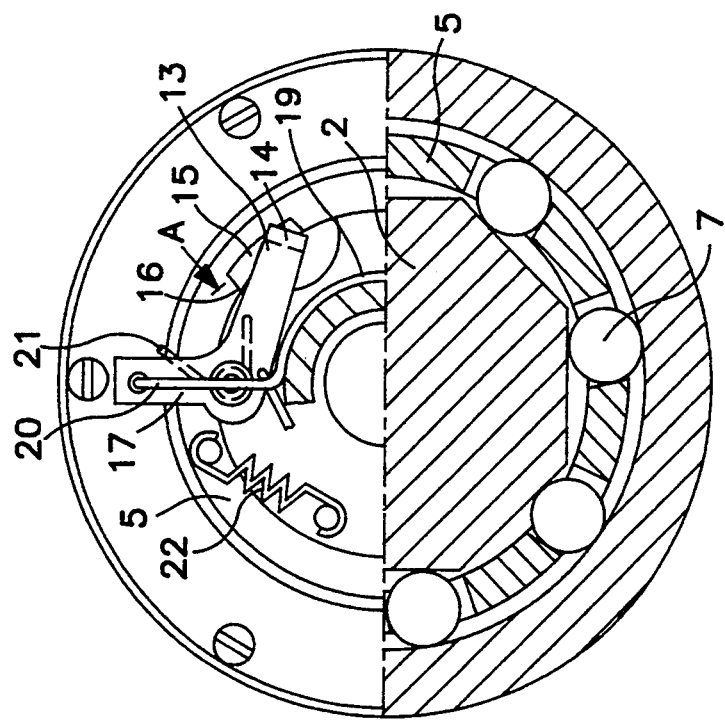
FIG. 2 shows a first embodiment of the coupling according to the invention, partly in a frontal view and partly in section II of FIG. 3.
Figure 3:
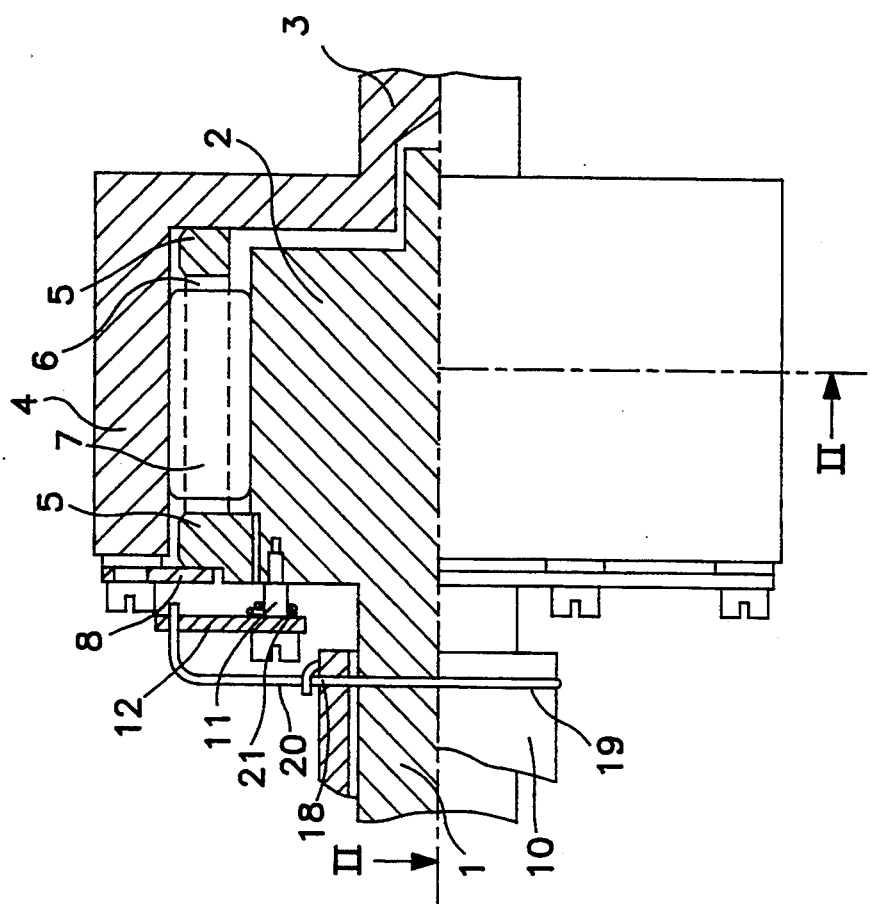
FIG. 3 shows section III—III of FIG. 2, with the lower half in lateral view.
Figure 7:
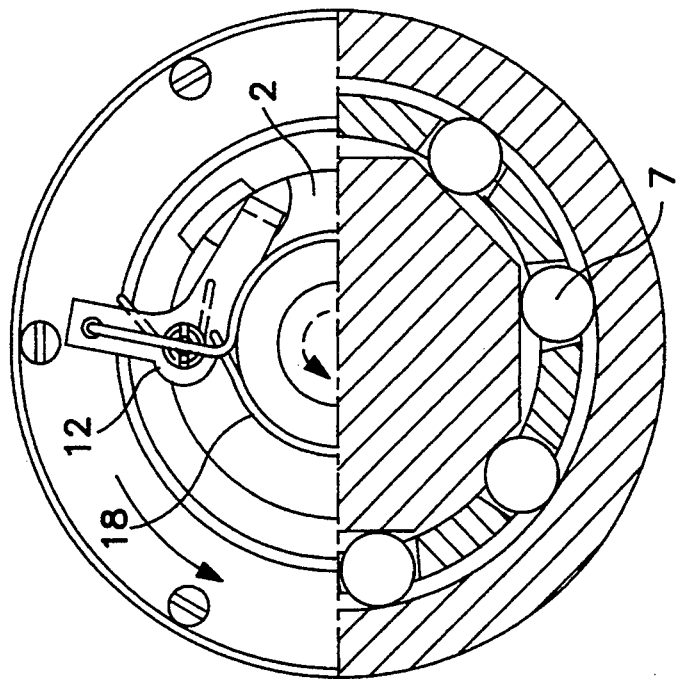

In the first embodiment of the invention shown in FIGS. 2, 3 and 4, a first shaft 1, here the drive shaft, bears a nearly polyhedral first ring 2 with the flat surfaces shown in FIG. 2, and a second ring 4 with a cylindrical running surface. The second ring 4 merges into the power take-off shaft 3. In the embodiment shown, the first ring 2 is the inner ring and the second ring 4 is the outer ring. The reverse is also possible, however. Between the two rings 2 and 4, a number of clamping or wedging rollers 7 and a roller cage 5 with windows 6 for receiving the clamping rollers 7 are installed. A friction element 8 constitutes a friction connection between the second ring 4 and cage 5 so that the cage 5 follows the second ring 4.

A latch 12 which swivels around a latch axle 11 is mounted on the first ring 2. The latch 12 comprises a first arm 13 which enters a recess 15 of the cage 5 with a hook 14, and a second arm 17 upon which a slipping spring 18 acts. The recess 15 is placed so that it presents a stop to the hook 14 when the cage is in neutral position, i.e., when the free-wheeling coupling runs freely. The slipping spring 18 comprises a loop 19 which loops around a fixed ring 10 in the manner of a lasso (it may loop around ring 10 several times), and a spring arm 20 which enters into an aperture in the second arm 17 of the latch 12.

The fixed ring 10 may be part of a housing which is not shown.

A retaining spring 21, here a hair-pin spring, acts on the arm 17 of latch 12 and presses the first arm 13 of the latch 12 into the recess 15. In addition, a tensions spring 22 whose tractive force tends to move the inner ring 2 and the cage 5 into the clutch or engaged position corresponding to the positive torque flow direction is also provided.

The operation of this free-wheeling coupling is as follows (see FIGS. 5 to 8):

During forward travel in towing mode (the engine drives the vehicle, FIG. 5), the first ring 2 (here the inner ring) drives the second ring 4 (here the outer ring) via the clamping elements 7 which are wedged between the first ring 2 and the second ring 4. The latch 12 is slaved over its axle 11 at the inner ring and its hook 14 is pressed by retaining spring 21 into the recess 15 of the cage 5. The second arm 17 of latch 12 slaves the spring arm 20 of the slipping spring 18 and rotates the loop 19 on the fixed ring 10 in the same direction of rotation as is shown in FIG. 5. Because of the winding direction of the slipping spring 18, friction is only minimal, and the spring arm 20 exerts a minimal force on latch 12 in assisting the retaining spring 21. When rotational speeds are higher, the loop 19 even widens through the effect of centrifugal force so that it no longer rubs at all on the fixed ring 10. Thus the free-wheeling coupling operates entirely without friction.

When the drive shaft 1 is now braked during forward travel (thrust mode, FIG. 6), the second ring 4 overruns the first ring 2 and becomes the driving ring (reversed torque flow direction). At the same time, the second ring 4 slaves cage 5 via friction element 8 until stop 16 comes to lie against hook 14. Cage 5 is now held in a neutral position as the clamping elements 7 are no longer wedged between the two rings and do not transmit any torque.

When changing over to reverse travel in towing mode (FIG. 7), the latch 12 and the spring arm 20 are slaved by the first ring 2 in the direction opposite to the direction of rotation. At the same time, the loop 19 of the slipping spring 18 tightens around the fixed ring 10 and is again immobilized. As a result, the spring arm 20 exerts a force upon the latch 12 which lifts the latter out of recess 15 in opposition to the force of the retaining spring 21. Cage 5 is no longer immobilized and can be slaved by the friction element 8 into the position in which the clamping elements 7 couple for the opposite torque flow direction.

Figure 8:
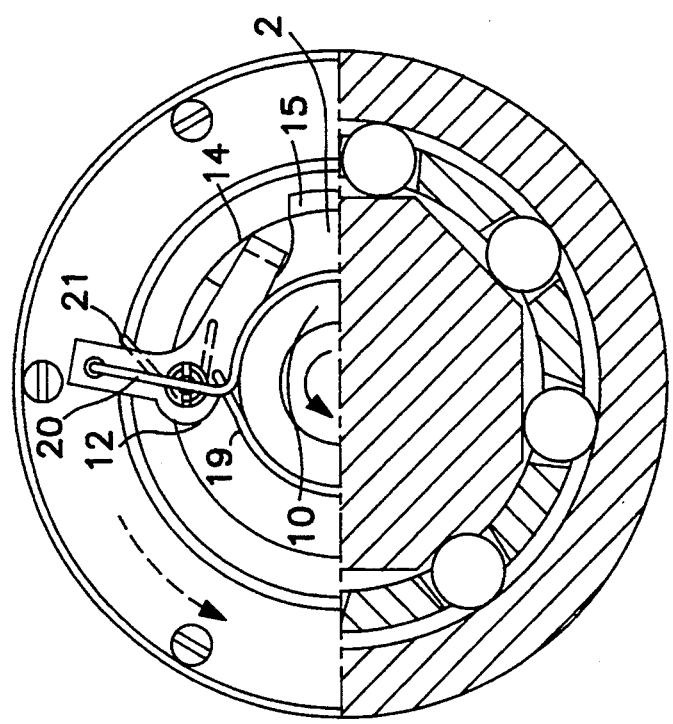

Towing mode again occurs (FIG. 8) when reverse travel is decelerated and the second ring 4 overruns the first ring 2. Since latch 12 is disengaged from cage 5 by the slipping spring 18 in this direction of rotation, the cage 5 is able to reach the coupling position corresponding to the other torque flow direction as shown in FIG. 8.

Figure 9:
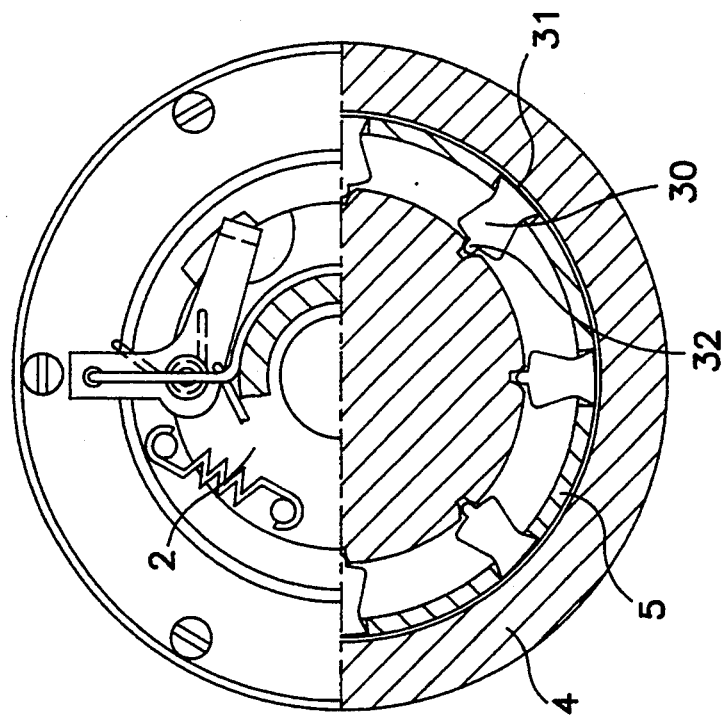
FIG. 9 shows a second embodiment of the coupling according to the invention, partly in frontal view and partly in a section IX of FIG. 10.
Figure 10:
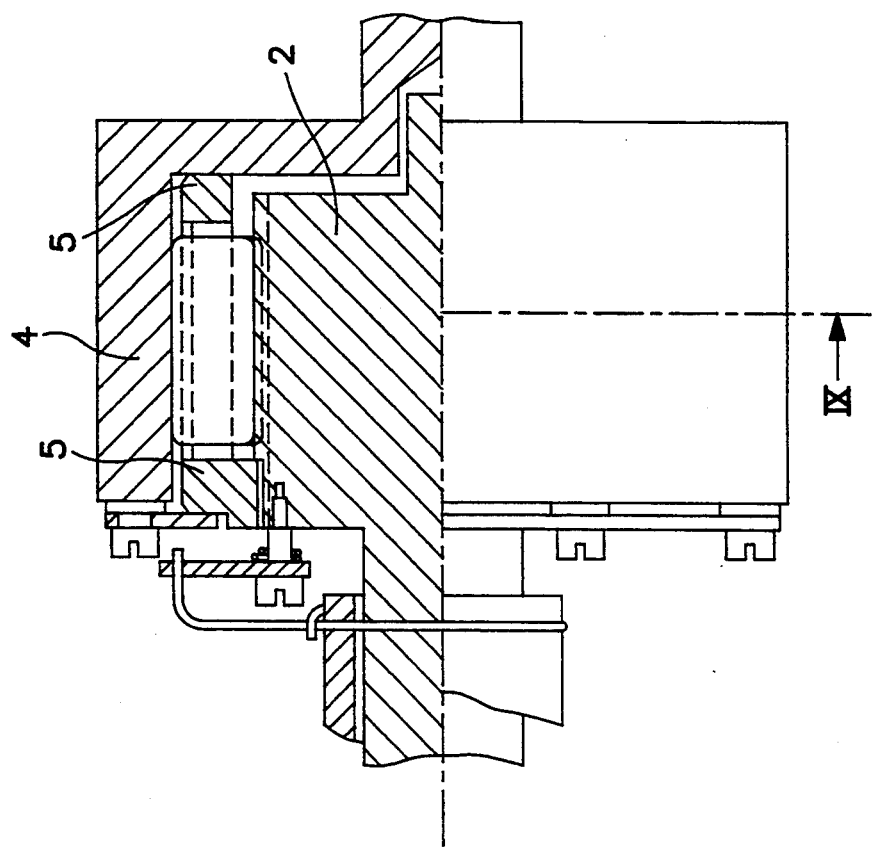
FIG. 10 shows section X—X of FIG. 9, with the lower half in side view.
Figure 11:
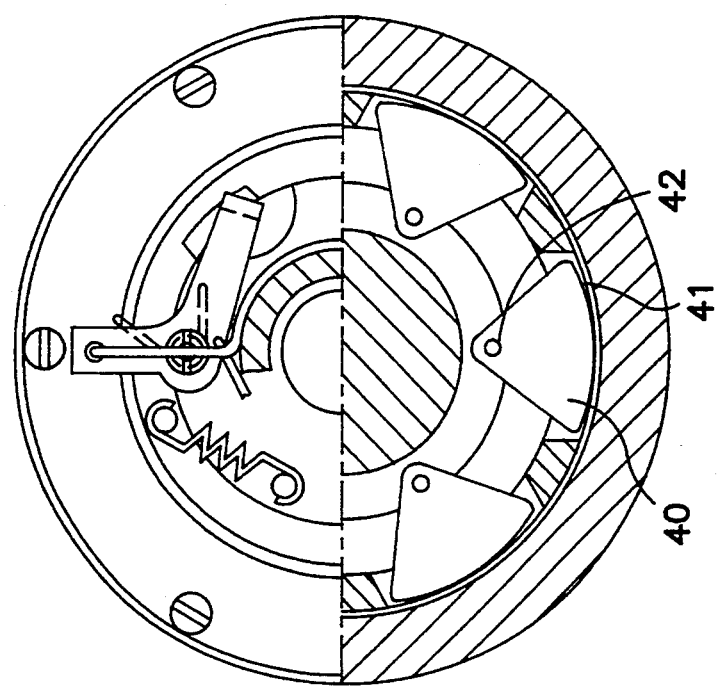
FIG. 11 shows a third embodiment of the coupling according to the invention, partly in frontal view and partly in section XI of FIG. 12.
Figure 12:
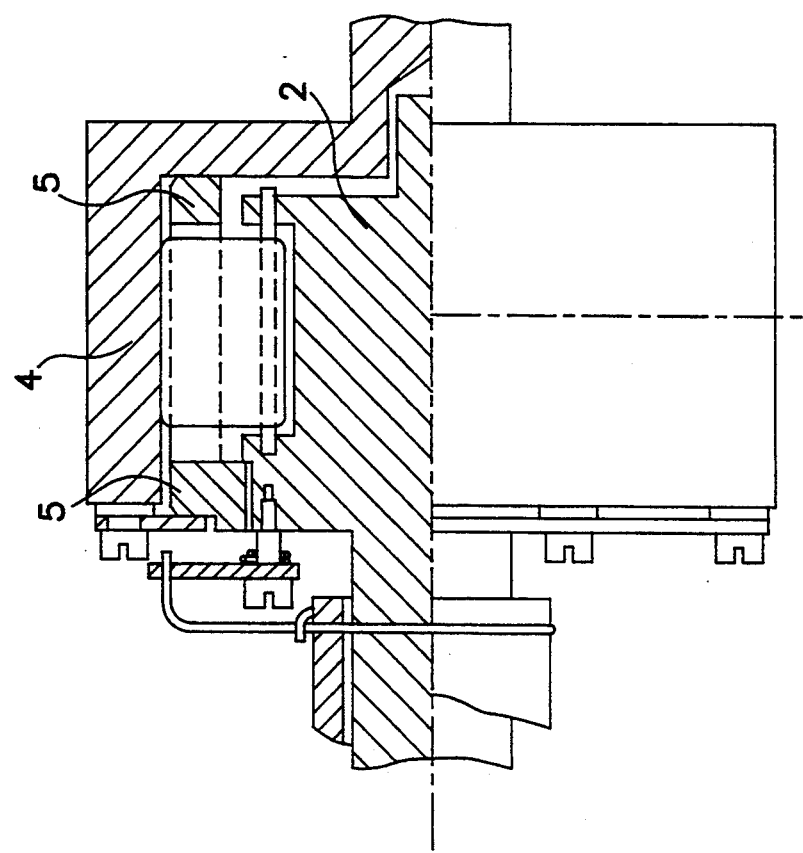
FIG. 12 shows section XII—XII of FIG. 11, with the lower half in lateral view.

In a second embodiment of the free-wheeling coupling according to the invention shown in FIGS. 9 and 10, the clamping elements 30 are provided on two sides with clamping surfaces acting in both directions of torque flow. They are in positive locking contact with the first ring 2 and frictionally engaged with the second ring 4. The first-mentioned contact is here established by involute teeth 32 which enter into corresponding gaps of the first ring 2. The frictional engagement with second ring 4 is by means of clamping surfaces 31. In all other respects, all is identical with the embodiment of the clamping rollers (FIGS. 2, 3 and 4). In an only slightly different third embodiment shown in FIGS. 11 and 12, the clamping elements 40 are provided with only one double-acting clamping surface 41 and the positive locking on the other ring may be produced by a slewable bolt 42.

Figure 13:
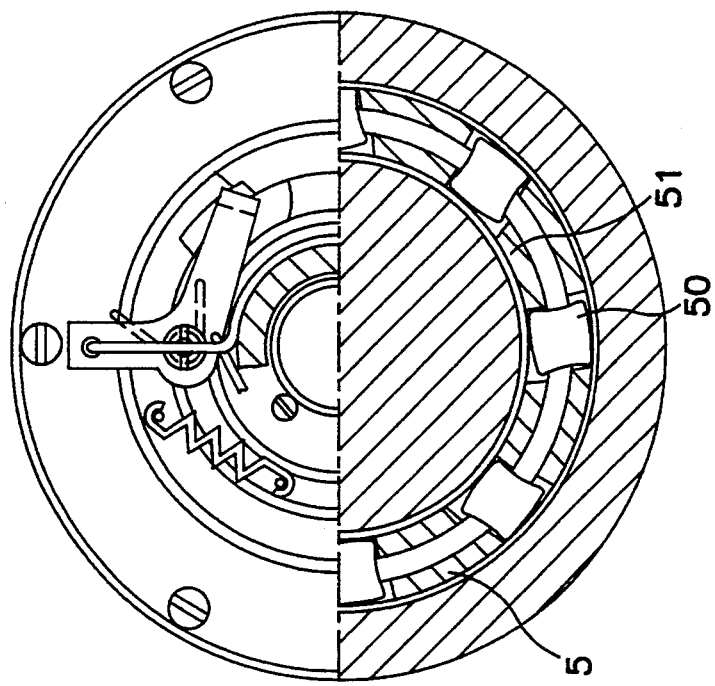
FIG. 13 shows a fourth embodiment of the coupling according to the invention, partly in frontal view and partly in section XIII of FIG. 14.
Figure 14:
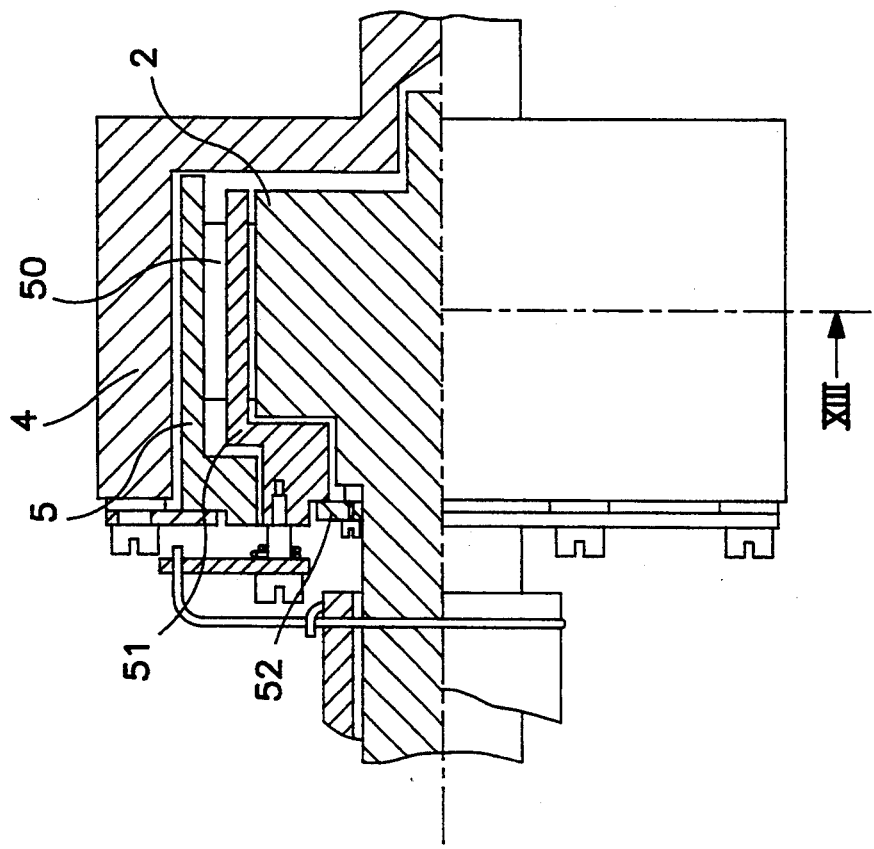
FIG. 14 shows section XIV—XIV of FIG. 13, with the lower half in lateral view.

In a fourth embodiment (FIGS. 13 and 14) the clamping elements 50 are provided on two sides with double-acting clamping surfaces and are only frictionally engaged with the two rings 2, 4. For this reason, a second cage 51 is provided which is slaved by the first ring 2 via an additional friction element 52. It is important for the friction connection with the additional frictional element 52 to be stronger than that of frictional element 8. It can be stated in general that the frictional element supporting the latch must dominate the other frictional element.

Figure 15:
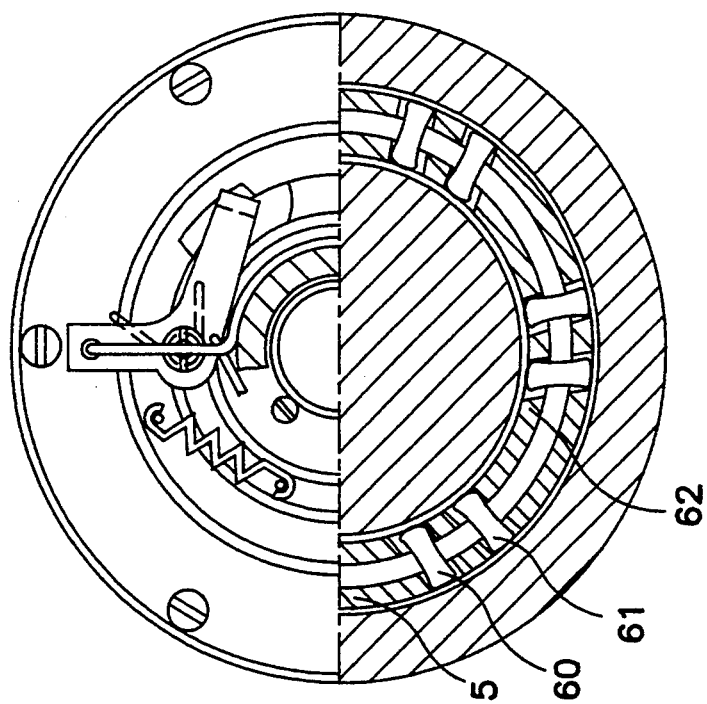
FIG. 15 shows a fifth embodiment of the coupling according to the invention, partly in frontal view and partly along section XV of FIG. 16.
Figure 16:
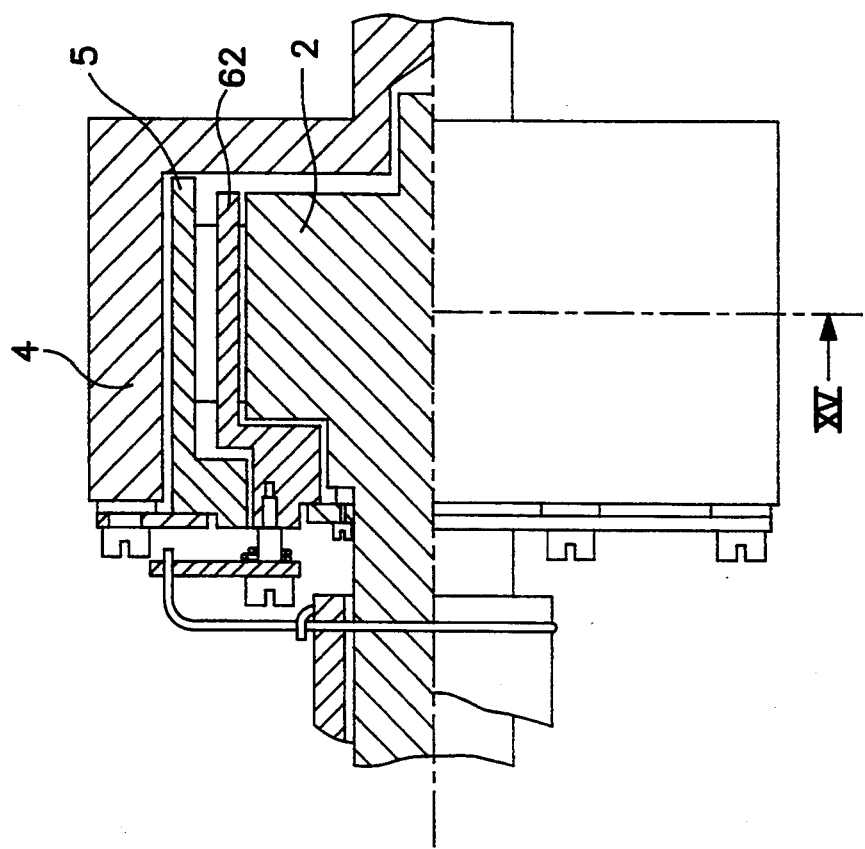
FIG. 16 shows section XVI—XVI of FIG. 13, with the lower half in side view.

In a fifth and only slightly different embodiment shown in FIGS. 15 and 16, two sets of clamping elements 60, 61 which act in opposite torque flow directions are provided. The arrangement of the additional cage 62 and of the additional frictional element is not different from that of the previous example.

Within the framework of the invention, many other embodiments are possible. Thus, for example, the first ring can also be an outside ring and the second ring can be an inner ring. Furthermore, the latch can also be mounted on a cage and act upon one of the rings. In all of these variations, the forms of latch and springs must be varied accordingly. In all variants, a free-wheeling coupling effect as a function of the direction of rotation is obtained.

I claim:

1. A rotationally dependent free-wheeling coupling for a motor vehicle, comprising
   a first ring which constitutes a driving element in a towing mode of the motor vehicle,
   a second ring which constitutes a driven element in said towing mode,
   clamping elements which act between the first and second rings to transfer torque between said first ring and said second ring in both directions of torque flow,
   at least a first cage in which said clamping elements are disposed,
   a friction element connecting said first cage to said second ring so that said first cage is urged to follow rotation of said second ring,
   a latch which acts between said first ring and said first cage, said latch being mounted for swivelling movement on an axle, said latch entering a recess of said first cage, said recess having a wall which constitutes a stop for said latch, said clamping elements being in a neutral position and not transferring torque between said first and second rings when said latch presses against said stop,
   a retaining spring which presses said latch into said recess of said first cage, and
   a slipping spring comprising a loop which is coiled around a fixed ring and a protruding spring arm which acts on said latch, said loop being coiled around said fixed ring in a direction of rotation such that said protruding spring arm causes said latch to disengage from said recess in opposition to said retaining spring when said vehicle is in reverse travel.

2. The free-wheeling coupling of claim 1, wherein said axle is mounted on said cage and said latch engages said first ring.

3. The free-wheeling coupling of claim 1 wherein said axle is located on said first ring and engages said cage.

4. The free-wheeling coupling of claim 1 wherein said clamping elements are clamping rollers.

5. The free-wheeling coupling of claim 1 wherein said clamping elements are interlockingly connected to said first ring and have clamping surfaces which engage against said second ring and which are active in both directions of torque flow.

6. The free-wheeling coupling of claim 1 wherein said clamping elements have clamping surfaces which are frictionally engaged against both said first and second rings, and wherein said freewheeling coupling further comprises a second cage frictionally engaged against said first ring, so as to be urged to rotate with said first cage, said latch acting between said first and second cages.

7. The free-wheeling coupling of claim 6 wherein said axle of said latch is mounted on said second cage, said latch engages said first cage, and the frictional force between said second cage and said first ring is greater than the frictional force between said first cage and said second ring.

8. The free-wheeling coupling of the claim 6 wherein said axle of said latch is mounted on said first cage, said latch engages said second cage, and the frictional force between said second cage and said first ring is less than the frictional force between said first cage and said second ring.

9. The free-wheeling coupling of claim 1 further comprising an additional spring acting between said first ring and said first cage.

10. The free-wheeling coupling of claim 1 wherein said first ring is an inner ring and said second ring is an outer ring.

* * * * *